United States Statutory Invention Registration [19]

[11] Reg. Number: H966

Waters et al. [43] Published: Sep. 3, 1991

[54] TWO-BEAM SCANNING ANTENNA REQUIRING NO ROTARY JOINTS

[75] Inventors: William M. Waters, Millersville, Md.; Clifford L. Temes, Alexandria, Va.

[73] Assignee: The United States of America as represented by the Government of the United States, Washington, D.C.

[21] Appl. No.: 620,182

[22] Filed: Nov. 30, 1990

[51] Int. Cl.[5] ..... H01Q 21/06

[52] U.S. Cl. ..... 342/361

*Primary Examiner*—Linda J. Wallace

*Attorney, Agent, or Firm*—Thomas E. McDonnell; Edward F. Miles

[57] ABSTRACT

This invention reduces the weight and bulk of shipboard-mounted microwave antenna systems by achieving horizontally and vertically polarized radar return signals without the need for a rotary joint.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TO CIRCULATORS 52
AND 54

TWO-BEAM SCANNING ANTENNA REQUIRING NO ROTARY JOINTS

BACKGROUND OF THE INVENTION

1. Field of the Invention

This invention relates to high frequency scanning radar antenna systems and, particularly, it relates to a radar scanner which operates without the need for rotary joints in rotating assemblies.

2. Discussion of the Prior Art

Antennas used in radar scanning and communications systems generally scan by means of a rotary pedestal or rotary joint which supports the antenna structure. Thus, in the past, such systems have had to resort to a separate rotary RF joint for each beam in order to pass the microwave signal between the antenna and the signal processing electronics. In most shipboard antenna installations the weight of the antenna itself becomes of special significance. Since the antenna and its feed normally are mounted aboard the rotating pedestal, the microwave (or millimeter wave) energy must either be transmitted by means of an RF rotary joint or be generated by devices located on the antenna. Processing the radar signals by devices located on the antenna or by resort to rotary RF joints is undesirable because of such factors as objectionable topside weight and the problems encountered when performing maintenance on electronic components located high above the deck. One important factor in the design and installation of shipboard antenna systems is the recognition that low-altitude targets may be detected at greater distances with antennas mounted relatively high in the mast with respect to the surface and that detection by line-of-sight ranges increases markedly when the height of the installation is brought to a maximum.

The present invention alleviates the problems by providing a scanning radar antenna in which the weight to be rotated is reduced, which operates without the need for a stabilized rotary platform, and which can conveniently be installed with radome cover on the ships mast for reduced blockage. Most importantly, the movable plane reflector of the type used, for example, in the azimuth scanning antenna shown in U.S. Pat. No. 3,916,416 has been replaced with a planar reflector which accomplishes its function without the need for a rotary joint.

SUMMARY OF THE INVENTION

The shipboard radar antenna system of the present invention comprises a horn at the focus of a parabolic reflector or lens and radiating a circularly polarized wave which is collimated by the reflector into a beam transmitted in an upward direction. The upwardly directed beam encounters a primary reflector which reflects practically all of one of the two orthogonal linearly polarized components of the circularly polarized wave, in a direction approximately perpendicular to the path of the collimated beam. This is referred to as the vertically polarized component of the wave. The horizontally polarized component of the beam passes through the primary reflector and encounters a planar twist reflector which reflects the energy back in the direction of the primary reflector but first rotating its polarization by 90 degrees. A second output beam now leaves the radome in a direction opposite to the direction taken by the first output beam. The energy reflected from targets in the path of either of these beams returns via the same two paths to become components of a circularly polarized wave returning to the feed. An electronic circuit separates these components and produces two signals from the front surface beam for which only the primary reflector is responsible, and from the twist reflector a beam which returns via the back surface of the main reflector. This has its polarization rotated 90 degrees by the planar twist reflector allowing it to pass through the main reflector back to the main collimating aperture and feed.

It is therefore an object of the invention to scan two vertically polarized antenna beams.

Another object of the invention is to scan a radar beam which eliminates the need for an RF rotary joint.

Still a further object of the invention is to derive two linearly polarized beams through apparatus which avoids the costliness and complexity of previously used shipboard installations.

Other objects of the invention will become apparent from the following detailed description of the embodiment of the present invention when taken in conjunction with the accompanying drawings.

DESCRIPTION OF THE PREFERRED EMBODIMENT

Figure 1:
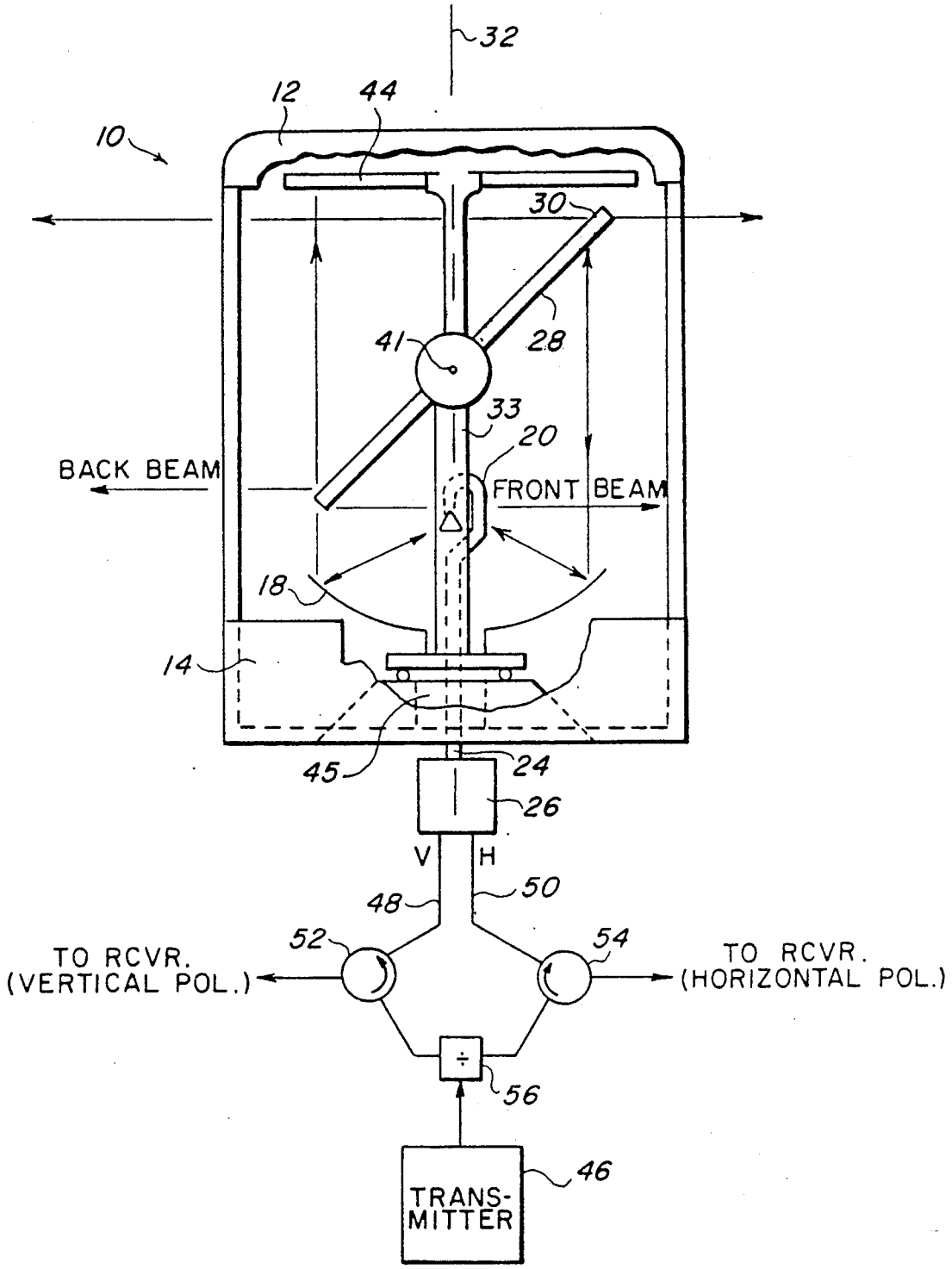
FIG. 1 is an illustration of the system according to the invention.

Referring now to Fig. 1, the reference character 10 generally designates an antenna system for generating linearly polarized beams. If essential, a cylindrical radome 12 is constructed of material which is strong and environmentally stable and which passes electromagnetic energy with little or no attenuation. Radome 12 is supported at its base by an essentially mounting member or base 14. When viewed from the top, radome 12 is generally circularly shaped.

In the center of the radome 12 is a parabolic reflector 18 and a feed horn 20. Horn 20 located at the focal point and above the parabolic dish 18 radiates energy which causes transmission of a collimated beam directed vertically upwardly from the parabolic dish as shown in FIG. 1.

Figure 2:
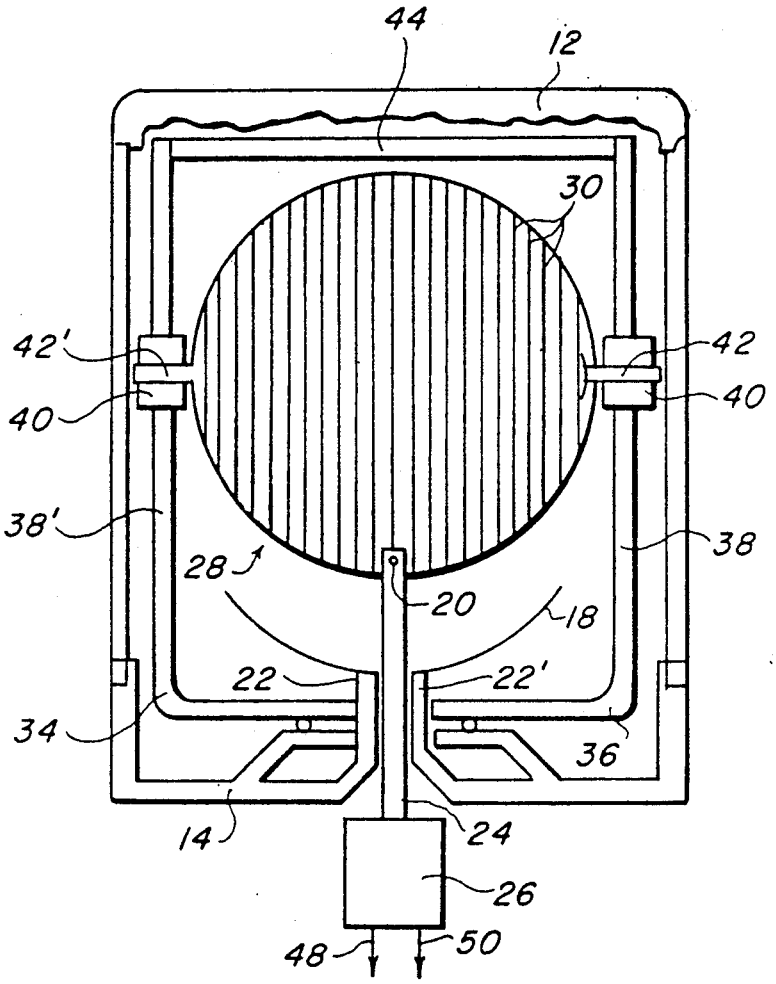
FIG. 2 depicts in front view the embodiment of FIG. 1.

Parabolic reflector 18 is mounted on essentially vertical supports 22 and 22' (FIG. 2) which extend generally upwardly from the base 14 to which the radome is fastened. A wave guide 24 coupled to a circular polarizer 26 passes between its supports 22, 22' to join the feed horn 20.

Located coaxially with the radome 12 is the rotating support for primary reflector 28 and twist reflector 44. Reflector 28 is of a conventional construction well known in the art. Often referred to as a "ribbed" reflector, the reflector 28 is composed of a number of parallel $\lambda/4$ deep ribs 30 spaced from each other about $\lambda/4$ where $\lambda$ is the wavelength of the energy collimated by the reflector 18. As viewed in FIG. 1, the plane of the reflector 28 is tilted approximately 45 degrees from the vertical axis 32 of the system. A generally U-shaped frame 34 having a base 36 and upwardly extending end pieces 38, 38' is arranged about the reflector 28. The end pieces 38, 38' are provided with bearing blocks 40, 40'.

Axial ends 42, 42' connected to the reflector 28 are journalled in the blocks 40, 40' to allow adjustment as desired of the tilt angle which the reflector 28 makes with the horizontal axis. Thus, reflector 28 may slightly be pivoted about point 41 in order to remain stabilized with respect to the horizon.

Fixedly mounted to the end pieces 38, 38' above the reflector 28 is the twist reflector 44 which, when viewed from the top in FIG. 1, is generally circularly shaped in order to match the dimensions of the beam collimated by the reflector 18.

The twist reflector 44 consists generally of two orthogonal grids of wires arranged in parallel planes, and spaced with grid wires at 45 degrees to the incident beam. This angular orientation of the grid provides a beam transmitted parallel to the horizontal axis. Half the incident energy is reflected by the front grid and half is reflected by the second, forming the "front" and "back" beams illustrated in FIG. 1. Only one of these two components is inverted (by the $\lambda/2$ delay) so that the reflected wave is polarized at 90 degrees relevant to the incident wave. Thus, reflector 44 changes the direction of polarization of an incident beam by 90 degrees and reflects it back. (Construction and operation of reflectors of this nature are well-known in the antenna field and requires no further discussion.) The frame 34 is mounted on a reflector rotating assembly 45, itself mounted on an azimuth drive pedestal (not shown) designed to rotate the frame 34 and, consequently the two reflectors 28 and 44, about the vertical axis 32.

The reflector 28 is constructed so as to reflect vertically polarized energy while passing horizontally polarized energy unhindered. The reflector 44 changes the direction of polarization of energy striking it by 90 degrees.

However, one should not infer that the polarization of the front and back beams are static. As with any wire or ribbed reflector, reflector 28 will split a non-linearly polarized beam into a pair of linearly polarized beams. One beam will be linearly polarized perpendicular to the length of reflector 28's ribs, and will pass through reflector 28; the other will be polarized along this length, and will be reflected back by reflector 28. As reflector 28 scans, the disposition of its ribs with respect to the circularly polarized feed from horn 20 changes continually (i.e. changes from $\theta=0°$ to 360° per scanning sweep). In effect, the perpendicular axes of polarization into which reflector 28 breaks its circularly polarized feed from 20 also changes continuously (i.e. rotates with respect to the fixed polarization axes of lines 48, 50, and circulators 52, 54). Thus the proportion of the front (or back) signal supplied by vertical and horizontal feed lines 48, 50, changes as reflector 28 scans. Stated alternatively, the directions in which the front and back beams are polarized rotate as reflector 28 scans, always remaining 90° apart.

Leading from the circular polarizer 26 to a transmitter 46 are two ports 48 and 50 through which, respectively, vertically and horizontally polarized energy components are conducted. Microwave circulators 52 and 54 of conventional design offer the further connection to the transmitter 46 though a divider 56.

As viewed in FIG. 1, the ribs 30 of reflector 28 diminish in width gradually over their length to form front and back plane surfaces which are not exactly parallel. This lack of parallelism is necessary to create a difference in the relative angle between the beams reflected by the front and back surfaces of reflector 28.

In operation, with the antenna system of FIG. 1 stationary and the reflectors 28 and 44 oriented as shown, circularly polarized radar frequency energy composed of two linearly polarized components is radiated from horn 20 and directed to parabolic reflector 18. The primary reflector 28 allows horizontally polarized energy to pass without resistance while reflecting the vertically polarized energy toward the right as shown in FIG. 1. If the front surface of reflector 28 is set at an angle of 45 degrees to the vertical axis 32 then the front surface beam will be launched horizontally. The orthogonally polarized component of the collimated beam then impinges on the twist reflector 44, which changes the direction of polarization of the reflected beam by 90 degrees and reflects back to the reflector 28 where upon it departs the radome to the left as shown in FIG. 1. That is, the rotation in the polarization state of the beam causes reflector 28 to reflect the beam. If the back plane of reflector 28 is at an angle greater than 45 degrees relative to the vertical axis 32, then the beam will be elevated with respect to the horizontal plane centered on the antenna installation. Both surfaces of reflector 28 are parallel to the horizontal axis 41. Energy reflected from a particular target to the right of the antenna system returns to the reflector 28 and is reflected downwardly onto reflector 18 where it is focused on the horn 20 and then guided through the circular polarizer 26 to port 48. The beam reflected from a particular target from the left is deflected by reflector 28 toward the twist reflector 44 where it is reflected with the plane of polarization changed by 90 degrees to become horizontally polarized. The reflector 28 appears transparent to the electromagnetic energy of a horizontally polarized wave and this energy now is focused on the horn 20 and then guided through the circular polarizer 26 to port 50.

As indicated in FIG. 1, the reflected front beam appears on part 48 as the vertically polarized component, while the reflected back beam appears on port 50 as the horizontally polarized component. From this it will be understood that polarizer 26 in the return mode separates the return signals into their linearly polarized components.

It will be appreciated that during rotation of reflector 28 in azimuth from the angle shown in FIG. 1, the vertical port 48 will begin to receive energy from the back beam, and the horizontal port 50 will receive signal energy from the front beam. When the azimuth angle $\theta$ has rotated 90 degrees all signal energy returning from the front beam will appear at the horizontal port 50 and all the beam energy returning from the left will appear at the vertical port 48.

Figure 3:
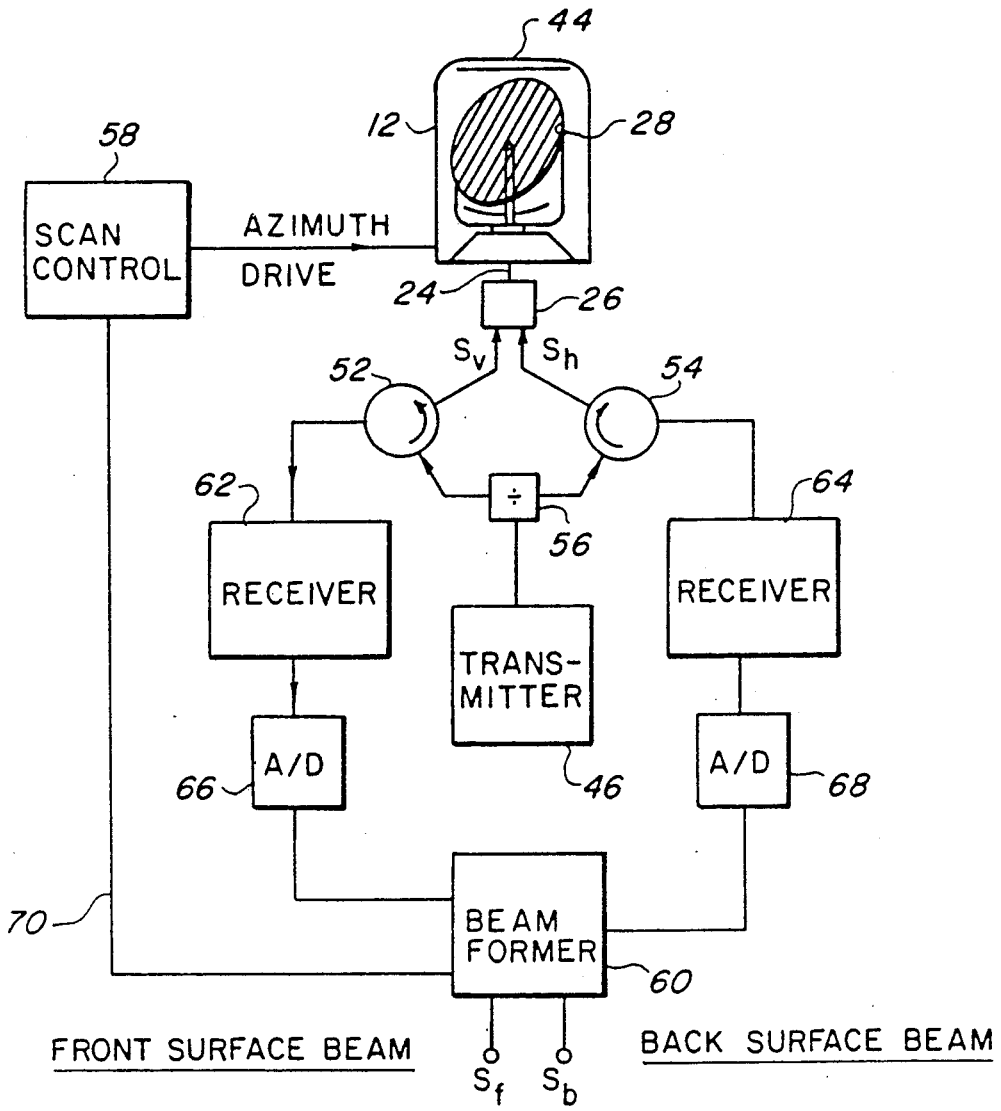
FIG. 3 shows additional circuitry for processing the signals from the embodiment of the invention depicted in FIG. 1.

Turning now to FIG. 3, it is necessary to collect all back and front beam signals at the corresponding ports by performing a linear combination of signals, $s_v$ and $s_h$, from the vertical and horizontal ports 48 and 50, respectively. Defining $s_f$ and $s_b$ to be the signals developed from the front and back returns, respectively, they may be recovered from $s_v$ and $s_h$ by the following operation:

$$\begin{pmatrix} s_f \\ s_b \end{pmatrix} = \begin{pmatrix} \cos\theta & -\sin\theta \\ \sin\theta & \cos\theta \end{pmatrix} \begin{pmatrix} s_v \\ s_h \end{pmatrix}$$

From this relationship, one skilled in the beam former art can program beam former 60 to output $s_f$ and $s_b$ from the input of circulators 52, 54, as indicated in FIG. 3. In particular, the returns developed from the linearly polarized components $s_v$ and $s_h$ are routed by the respective circulators 52 and 54 through first, receivers 62 and 64, and then through analog-to-digital converters 66 and 68. By means of a line 70 a signal representing the angle $\theta$ is fed continuously from scan control 58 to a beam former 60. Expanding the matrix equation, the front surface beam, $s_f$ from which the vertical component is derived may be represented as follows:

$$s_f = s_v \cos\theta - s_h \sin b. \quad (1)$$

By parallel construction, the back surface beam, $s_6$, from which the horizontal component is derived, may be represented as follows:

$$s_b = s_v \sin\theta + s_h \cos\theta. \quad (2)$$

As has been described above, the present invention enables reduction in the weight that must be rotated, eliminates the need for a rotary joint at a considerable savings in cost, and is able to provide horizon stabilization to compensate for movements of the ship.

We claim:

1. A system for generating two linearly polarized beams comprising:

transition means for producing electromagnetic wave energy;

a bidirectional parabolic antenna system with feed joint coupled to said transmitter means;

a supporting structure for said antenna system oriented to project a circularly polarized beam essentially upwardly of said antenna system and parallel to a vertical axis coincident with the center of said antenna system;

a primary reflector disposed to intercept said beam so constructed as to reflect vertically polarized energy while passing horizontally polarized energy unhindered, wherein vertically polarized energy reflected by said primary reflector is called a front beam, and horizontally polarized energy passed by said primary reflector is called a back beam;

a twist planar reflector mounted above said primary reflector in the path of said beam so constructed as to change the polarization of energy striking it by ninety degrees.

rotating means attached to said primary and twist planar reflectors for rotating said reflectors simultaneously about said vertical axis;

signal processing means coupled to said feed joint for linearly combining the vertically and horizontally polarized signals corresponding to said front and said back beams generated by said reflectors;

and scan control means for feeding the azimuth angle of said rotating means to said signal processing means.

2. The system of claim 1 wherein said primary reflector is composed of a number of parallel quarter-wavelength deep ribs spaced from each other about one-quarter wavelength where the wavelength is the wavelength of said circularly polarized beam.

3. The system of claim 2 wherein the plane of said ribs of said planar reflector is tilted approximately forty-five degrees from said vertical axis.

4. The system of claim 1 wherein said twist reflector is composed of two orthogonal grids of wires arranged in parallel planes, and spaced with grid wires at 45 degrees to the incident polarization.

5. The system of claim 1 wherein said front and back beams have directions angularly spaced from each other by approximately 180 degrees.

6. The antenna system of claim 1 wherein said reflectors are enclosed by a protective cover transparent effectively to electromagnetic waves.

* * * * *